United States Patent

Watanabe et al.

[11] Patent Number: 5,470,608
[45] Date of Patent: Nov. 28, 1995

[54] SURFACE COATING AGENT AND SURFACE COATING METHOD FOR ELASTIC MOLDING DIE

[75] Inventors: Akinori Watanabe, Shibuya; Itaru Horiguchi; Atsushi Sato, both of Ryugasaki; Hiroshige Kohno, Arakawa; Kenji Ikeda, Arakawa; Yujiro Iwasaki, Arakawa, all of Japan

[73] Assignees: Okamoto Industries, Inc.; Asahi Denka Kogyo Kabushikikaisya, both of Tokyo, Japan

[21] Appl. No.: 258,818

[22] Filed: Jun. 13, 1994

[30] Foreign Application Priority Data

Jun. 16, 1993 [JP] Japan ..................... 5-144680

[51] Int. Cl.⁶ ............... B05D 3/10; B05D 1/36; B32B 27/40
[52] U.S. Cl. ............. 427/133; 427/307; 427/407.1; 428/424.2
[58] Field of Search ................. 427/133, 135, 427/239, 307, 322, 407.1; 428/424.2, 424.8

[56] References Cited

U.S. PATENT DOCUMENTS

| Re. 33,290 | 8/1990 | Naka et al. | 521/110 |
| 3,837,969 | 9/1974 | Mezynski | 156/416 |
| 4,024,317 | 5/1977 | Stoye et al. | 428/423 |
| 5,004,627 | 4/1991 | Presswood et al. | 427/133 |
| 5,332,190 | 7/1994 | Watanabe et al. | 249/115 |

FOREIGN PATENT DOCUMENTS

| 0220898 | 5/1987 | European Pat. Off. . |
| 0519372 | 12/1992 | European Pat. Off. . |

OTHER PUBLICATIONS

Database WPI Section Ch, Week 9121, Derwent Publications, Ltd., London, GB, Abstract of JP-A-03-087205 (Apr. 12, 1991).

*Primary Examiner*—Shrive Beck
*Assistant Examiner*—Fred J. Parker
*Attorney, Agent, or Firm*—Sherman and Shalloway

[57] ABSTRACT

A surface coating agent to be coated on the surface of an elastic molding die, which is a solvent solution of a polyurethane obtained by reacting a polyol with an aromatic polyisocyanate. The surface coating agent can be coated on the inside surface of the elastic molding die to form a coating layer, thereby obtaining a molding with surface gloss. Further, the surface coating agent can be incorporated with silicone and/or a fluorine compound to improve oil resistance of the elastic molding die, preventing the elastic molding die from being swollen by oil components of a molding material and improving durability. When a polyether type polyol is used as the polyol, water resistance of the elastic molding die can be even further improved. The surface coating agent using polycarbonatepolyol as the polyol has improved adhesion to the elastic molding die, thereby improving the durability. Further, the surface coating layer can be even more securely bonded to the surface of the elastic molding die by coating the surface coating agent after primer coating, or after acid treatment, or after acid treatment and primer coating.

12 Claims, No Drawings

5,470,608

SURFACE COATING AGENT AND SURFACE COATING METHOD FOR ELASTIC MOLDING DIE

FIELD OF THE INVENTION

This invention relates to a surface coating agent for an elastic molding die. More specifically, the present invention relates to a surface coating agent for coating an inside surface of an elastic molding die to improve releasing and surface gloss of a molding produced using the elastic molding die. The present invention also relates to a method for coating the elastic molding die with the surface coating agent.

DESCRIPTION OF PRIOR ART

Heretofore, there has been known a method for molding chocolate, cheese, jelly, ice, boiled fish paste, lipsticks, and the like using a hollow elastic molding die having an opening which is made of an elastic material such as chloroprene rubber. This molding method is carried out as follows. A fluid molding material is poured into the molding die from its opening to fill the die, heated or cooled to solidify the molding material, and then the solidified molding is removed from the elastic molding die. To take out the molding from the elastic molding die, for example, the elastic molding die is expanded by means of utilizing an air pressure difference to peel the solidified molding from the elastic molding die, and the molding is discharged from the expanded opening. The elastic molding die can be repeatedly used.

However, the elastic molding die is made of an elastic material incorporated with a reinforcing material such as carbon black or clay to improve the mechanical properties and durability. When molded using the elastic molding die, surface gloss of the molding tends to be due to the incorporated reinforcing material which may impair the product quality, especially for molded chocolate and lipsticks which are required to have good surface gloss. Furthermore, there has been a problem in that when the molding material contains water or is based on an oily substance, the inside surface of the elastic molding die is gradually swelled resulting in deformation during repeated use of the elastic molding die. Further, due to such swelling, the inside surface of the elastic molding die is roughened, losing the surface gloss of the molded product. To solve these problems, the inventors previously proposed that the inner layer of the elastic molding die be formed from an elastomer not containing a reinforcing material or be formed from an oil-resistant elastomer (Japanese Laid-open Patent Publication 5-57730).

Therefore, a primary object of the present invention is to improve the previous proposal for the layer forming the inside surface of the elastic molding die. Another object of the present invention is to provide a surface coating agent for coating on the inside surface of the elastic molding die to form a film. That is, the present invention is to provide a surface coating agent which has good adhesion to the elastic molding die, can produce a molding having good surface gloss, has good releasability of the molding from the molding die, and endows the elastic molding die with durability so that it does not deform during repeated use. A further object of the present invention is to provide a method for coating the elastic molding die with the above surface coating agent.

SUMMARY OF THE INVENTION

In accordance with the present invention, there is provided a surface coating agent for an elastic molding die comprising a solvent solution of a polyurethane obtained by reacting a polyol with an aromatic polyisocyanate. There is also provided according to the present invention a surface coating agent for an elastic molding die comprising the above surface coating agent mixed with silicone and/or a fluorine compound. There is further provided according to the present invention a surface coating method for an elastic molding die comprising the steps of: coating a primer on the surface of an elastic molding die, and coating thereon a surface coating agent comprising a solvent solution of a polyurethane obtained by reacting a polyol with an aromatic polyisocyanate. There is further provided according to the present invention a surface coating method for an elastic molding die comprising the steps of: treating the surface of an elastic molding die with an acid, and coating thereon a surface coating agent comprising a solvent solution of a polyurethane obtained by reacting a polyol with an aromatic polyisocyanate. There is further provided according to the present invention a surface coating method for an elastic molding die comprising the steps of: treating the surface of an elastic molding die with an acid, coating a primer on the treated surface, and coating thereon a surface coating agent comprising a solvent solution of a polyurethane obtained by reacting a polyol with an aromatic polyisocyanate.

The elastic molding die in the present invention is made from an elastomer latex comprising an elastomer such as natural rubber, chloroprene rubber, or the like mixed with a reinforcing material such as carbon black, clay, or the like to improve the mechanical properties and durability.

The surface coating agent of the present invention for coating the elastic molding die is a solvent-based liquid comprising a solvent solution of a polyurethane obtained by reacting a polyol with an aromatic polyisocyanate. A polyurethane layer is formed by coating the surface coating agent on the surface of the elastic molding die. The polyurethane layer provides improved properties during molding. The polyol used in the present invention includes a polyether polyol and a polyester polyol. The polyether polyol can be polyoxypropyleneglycol, polyoxypropylene-polyoxyethyleneglycol, polyoxyethyleneglycol, and the like. These polyols preferably have a molecular weight of 500 to 5,000. The polyester polyol can be a condensation product of a polybasic acid and a polyhydric alcohol such as a condensation product of phthalic acid or adipic acid with ethyleneglycol or trimethylolpropane.

In the present invention, when the molding material contains moisture and oil, and the elastic molding die is particularly required to have water resistance and oil resistance, it is preferable to use the polyether polyol. When the molding material is an oily material, and the elastic molding die is required to have oil resistance, it is preferable to use the polyester polyol. In general the molding material often contains moisture and the polyether polyol is used.

In the present invention, polycarbonate polyol is preferably used as a polyol. When polycarbonate polyol is used, the resulting polyurethane coating layer is superior in oil resistance, and provides a molding with even better gloss. The coating layer has good adhesion to the elastic molding die, and is superior in durability. The polycarbonatepolyol can be obtained by reacting a glycol such as dimethyleneglycol, trimethyleneglycol, tetramethyleneglycol, hexamethyleneglycol, p-xylyleneglycol with a carbonate using a conventional method known in the art.

In the present invention, the aromatic polyisocyanate, can be dipheylmethanediisocyanate, tolylenediisocyanate, naphthalenediisocyanate, triphenylmethanetriisocyanate, and the like. As a polyurethane comprising a polyether polyol and an aromatic polyisocyanate, CRISVON-6216 (tradename, Dainippon Ink and Chemicals) or the like is preferably used. The reaction of the polyol and the aromatic polyisocyanate is carried out using a conventional method known in the art.

The solvent for the polyurethane can be dimethylformamide, methylethylketone, and the like. The polyurethane is contained in the coating agent in a concentration of 3 to 30% by weight, preferably 5 to 20% by weight, and the solution preferably has a viscosity of 100 to 1,000 centipoises. The surface coating agent can be further incorporated with an additive such as a stabilizer. Furthermore, adhesion of the surface coating agent to the elastic molding die can be improved by adding an aromatic polyisocyanate to the solvent solution.

In the present invention, the surface coating agent can be further incorporated with a silicone and/or a fluorine compound to endow water and oil repellency. The silicone used in the present invention can be methylhydrogen-polysiloxane, dimethylpolysiloxane, dimethylmethylphenyl-polysiloxane; amino-modified, epoxy-modified, carboxy-modified, and alcohol-modified substances thereof; and fluorinated silicone rubber. The fluorine compound includes polytetrafluoroethylene, polyfluorovinyl, and the like. By incorporating these silicone and fluorine compound, gloss, releasability, and filling properties of the molding can be even further improved. The silicone and/or fluorine compound is added in an amount of 0.05 to 10% by weight as solid in the surface coating agent.

The surface coating agent of the present invention is dissolved in a solvent, and coated on the inside surface of the elastic molding die to form a film. To coat the solution on the inside surface of the elastic molding die, the elastic molding die is turned inside out, and coated with the surface coating agent by spraying, brushing, dipping, or the like. After coating, the elastic molding die is dried and heated to react the polyol and the polyisocyanate forming a polyurethane layer. Since the present invention uses a solvent coating agent, adhesion of the surface coating agent to the elastic molding die, water resistance, and oil resistance are improved, and gloss of the molding can be improved to a great extent. Further, the inventive surface coating agent can also be coated on the outside surface of the elastic molding die to endow the outside with oil resistance. By providing the outside of the elastic molding die with oil resistance, damages to the molding die due to adherence of the molding material to the outside of the elastic molding die during the molding work can be prevented.

The surface coating agent of the present invention may be coated directly on the elastic molding die, but adhesion of the elastic molding die to the surface coating agent can be improved by coating a primer to form a primer layer and then coating the surface coating agent, thereby obtaining a film having improved durability. It is preferable to use polydiene-modified polyurethane as a primer. That is, using a polydiene as a polyol, which is based on a homopolymer such as chloroprene, butadiene, or a copolymer thereof with acrylonitrile or styrene having hydroxyl groups as terminal groups, and a polydiene-modified polyurethane obtained by reacting the polyol with a polyisocyanate is used as a primer. A solvent solution of the polydiene-modified polyurethane is coated on the elastic molding die, and heat dried to form a primer layer of the polydiene-modified polyurethane. In addition, various compounds are used as the primer. Since the primer stands at an adhesion layer between the elastic molding die and the surface coating agent to improve adhesion between both, it is preferable to use a solvent solution of a mixture of the same or similar elastomer to the elastomer forming the elastic molding die and the same or similar compound to the compound constituting the surface coating agent. In general, a mixture solution of rubber and polyurethane is used. The rubber can be chloroprene rubber, natural rubber, nitrile/butadiene rubber, and the like. The polyurethane can be various polyurethanes used in the inventive surface coating agent. In addition, solvent-free compounds such as cyanoacrylate compounds, epoxy compounds, and the like can be used. Further, a primer of a type which reacts with the elastic molding die or the surface coating agent can also be used. The primer for the elastic molding die is coated by spraying, dipping, or the like, followed by heat drying. Depending on the type of primer, the heat drying is carried out typically at 50° to 110° C. for 1 to 5 minutes.

Further, adhesion between the elastic molding die and the surface coating agent can be improved by acid treating the surface of the elastic molding die and then coating the surface coating agent. This is considered as due to the fact that by acid treatment, the surface of the elastic molding die is roughened, which enhances adhesion to the surface coating agent to improve the peeling strength. The acid treatment is preferably carried out in the production process of the elastic molding die. That is, it is preferable that a master die of the elastic molding die is immersed in an elastomer latex to solidify an elastic material on the surface, the solidified film is peeled from the master die, washed with water to extract the solidification agent, dried, and then acid treated. Acid treatment is applied to the surface of the elastic molding die to be coated. That is, when the surface coating agent is coated only on the inside surface (contacting with the molding material during molding) of the elastic molding die, only the inside surface to be coated is acid treated, and when the entire surface of the elastic molding die, that is, the outside surface and inside surface, is coated with the surface coating agent, the entire surface of the elastic molding die is acid treated.

The acid used in the acid treatment can be inorganic acids such as sulfuric acid, hydrochloric acid, and nitric acid, and sulfuric acid is particularly preferable. The acid is preferably used in the form of aqueous solution, for example, for sulfuric acid, of a concentration of 2 to 8%, preferably 4 to 5%. The acid treatment is preferably carried out by dipping. The treating time depends on the acid concentration. For example, when 5% sulfuric acid is used, the treating time is 2 to 6 minutes, preferably 3 to 5 minutes. The temperature is 10° to 30° C. After treating with acid, the elastic molding die is neutralized with 2% ammonia water, washed in water, and subjected to the subsequent coating process. After the acid treatment, the above primer coating can be made, and then coated with the surface coating agent to obtain an even stronger, durable film.

DETAILED DESCRIPTION OF PREFERRED EMBODIMENTS

The present invention will now be described with reference to the examples.

EXAMPLE 1

| | |
|---|---|
| Chloroprene rubber latex (as solid) | 100 wt. parts |
| Zinc oxide | 5 |
| Dithiocarbamate type vulcanization accelerator | 1 |
| Thiouram type vulcanization accelerator | 1 |
| Antioxidant | 2 |
| Clay | 10 |
| Stabilizer | varied |
| Glycin (20%) | varied |

A ceramic-made master die was first dipped in 20% calcium nitrate, and then in the above-prepared latex for 2 to 10 minutes, taken out, and dried at 90° C. for 30 minutes. The solidified latex was peeled from the master die, extracted with 1% ammonia water, and dried at 90° C. for 60 minutes to form an elastic molding die.

One mole of polyoxypropyleneglycol having a molecular weight of 3,000 and 1 mole of diphenylmethanediisocyanate were reacted by a conventional method to obtain a polyurethane, which was dissolved in dimethylformamide to a solid content of 20% by weight to prepare a surface coating agent. The surface coating agent was coated on the inside surface of the above elastic molding die. Coating was carried out by turning inside out the elastic molding die to bring out the inside, inflating the elastic molding die by a gas pressure, and dipping the inflated die in the surface coating agent. Then, the die was dried at 90° C. for 5 minutes, and then at 140° C. for 60 minutes.

Further, the surface coating agent was formed to a sheet, and tested for physical properties. The sheet had an elongation of 600 to 700%, a tensile strength of 600 to 700 kgf/cm$^2$, and a 300% modulus of 80 to 100 kgf/cm$^2$.

The above surface coated elastic molding die was subjected to various tests. The test results are shown in Table 1. When a condensation product of adipic acid and ethyleneglycol was used instead of the polyoxypropyleneglycol, similar results as Example 1 were obtained.

Comparative Example 1

The elastic molding die produced in Example 1 was coated on the inside surface with a polyester urethane emulsion (Dai-ichi Kogyo Seiyaku, SUPERFLEX E-2000) and heated using the same procedure as in Example 1.

The thus surface coated elastic molding die was subjected to various tests. The test results are shown in Table 1.

EXAMPLE 2

One mole of polyoxypropyleneglycol having a molecular weight of 3,000 and 1 mole of diphenylmethanediisocyanate were reacted by a conventional method to obtain a polyurethane, which was dissolved in dimethylformamide to a solid content of 20% by weight. 100 parts by weight of this solution was mixed with 2 parts by weight of a 40 wt. % methylhydrogenpolysiloxane solution to prepare a surface coating agent. The surface coating agent was coated on the inside surface of the elastic molding die produced according to Example 1, and heated. Coating and heating were carried out using the same procedure as in Example 1. The surface coated elastic molding die was subjected to various tests. The test results are shown in Table 1.

EXAMPLE 3

One mole of polycarbonatepolyol obtained by reacting hexamethyleneglycol and ethylenecarbonate by a conventional method and 1 mole of diphenylmethanediisocyanate were reacted to obtain a polyurethane, which was dissolved in dimethylformamide to a solid content of 20% by weight to obtain a surface coating agent. The surface coating agent was coated on the inside surface of the elastic molding die produced according to Example 1, and heated. Coating and heating were carried out using the same procedure as in Example 1.

The surface coating agent was formed to a sheet, and tested for physical properties. The sheet had an elongation of 650 to 700%, a tensile strength of 600 to 700 kgf/cm$^2$, and a 100% modulus of 30 to 50 kgf/cm$^2$.

The above surface coated elastic molding die was subjected to various tests. The test results are shown in Table 1.

TABLE 1

| | Ex. 1 | Ex. 2 | Ex. 3 | Comp. Ex. 1 |
|---|---|---|---|---|
| Oil resistance | B | B | A | D |
| Gloss | B | A | A | C |
| Adhesion | B | B | A | C |
| Releasability | B | A | B | C |
| Filling | B | A | B | C |

Various evaluations were made as follows:

Oil resistance: The elastic molding die is immersed in cacao oil at 40° C. for 7 days to test for swelling and peeling.

Gloss: The elastic molding die is repeatedly used to form chocolate, observing the gloss of the molding at every use, and evaluation is made comprehensively from the repetition and gloss.

Adhesion: The elastic molding die is elongated by 200% and returned to the original state. This cycle is repeated 1,000 times to test for cracking of the surface coating agent.

Releasability: Ease to take out a chocolate molding from the elastic molding die is tested.

Filling: Flowing is tested when chocolate is poured into the elastic molding die.

A to D in Table 1 mean as follows:

A: Very good
B: Good
C: Poor
D: Very poor.

From the test results, it can be seen that the surface coating agent used in the Examples of the present invention are superior to the Comparative Example using an aqueous emulsion type polyurethane in the surface coating agent. Oil resistance, gloss, adhesion, releasability, and filling properties are improved by incorporating silicone.

EXAMPLE 4

The elastic molding die produced in Example 1 was coated on the inside surface with a surface coating agent of the following composition, and heated. Coating and heating were carried out using the same procedure as in Example 1.

| | |
|---|---|
| CRISVON-6216 (Dainippon Ink and Chemicals) | 200 wt. parts |
| Diphenylmethanediisocyanate | 7 |
| Dimethylformamide | 250 |
| Polytetrafluoroethylene | 10 |

The same results as Example 2 were obtained.

EXAMPLE 5

One mole of polychloroprenepolyol and 1 mole of diphenylmethanediisocyanate were reacted by a conventional method to obtain a polyurethane, which was dissolved in dimethylformamide to a solid content of 20% by weight to obtain a primer. The primer was dip coated on the inside surface of the elastic molding die produced in Example 1, and dried at 91° C. for 4 minutes.

One mole of polycarbonatepolyol obtained by reacting hexamethyleneglycol and ethylenecarbonate by a conventional method and 1 mole of diphenylmethanediisocyanate were reacted by a conventional method to obtain a polyurethane, which was dissolved in dimethylformamide to a solid content of 20% by weight. 100 parts by weight of this solution was mixed with 2 parts by weight of a 40 wt. % methylhydrogenpolysiloxane solution to prepare a surface coating agent. The surface coating agent was dip coated on top of the above primer layer, dried at 90° C. for 5 minutes, and then at 140° C. for 60 minutes.

The resulting elastic molding die was very good in adhesion of the surface coating layer with reduced peeling or cracking, and superior in durability. Further, the elastic molding die was superior in oil resistance and filling properties, and was able to provide a molding with improved gloss.

EXAMPLE 6

A ceramic-made, rose flower-shaped master die was first dipped in 20% calcium nitrate, and then in the latex of Example 1 for 2 to 10 minutes, taken out, and dried at 90° C. for 30 minutes. The solidified latex was peeled from the master die, extracted with 1% ammonia water, and dried at 90° C. for 60 minutes to form an elastic molding die having a rose flower-shaped inside surface.

The solidified film was turned inside out, that is, the surface contacting the molding material during molding coming outside, that surface was dipped in 5% aqueous sulfuric acid solution at 20° C. for 3 minutes, taken out, thoroughly washed in water, and dried.

One mole of polycarbonatepolyol obtained by reacting hexamethyleneglycol and ethylenecarbonate by a conventional method and 1 mole of diphenylmethanediisocyanate were reacted to obtain a polyurethane, which was dissolved in dimethylformamide to a solid content of 20% by weight to obtain a surface coating agent.

The above surface coating agent was dip coated on the acid treated surface of the solidified film. The film was then dried at 90° C. for 5 minutes, and then at 140° C. for 60 minutes to vulcanize. Finally, the solidified film was again turned inside out to the original state to obtain an elastic molding die having a coating on the inside surface.

EXAMPLE 7

A rose flower-shaped solidified film was formed according to Example 6. The solidified film was turned inside out, and the surface was dipped in 5% aqueous sulfuric acid solution at 20° C. for 3 minutes, taken out, thoroughly washed in water, and dried. 5 Parts by weight of chloroprene rubber and 5.5 parts by weight of polyurethane (prepared by reacting polyesterpolyol obtained by reacting adipic acid and ethyleneglycol and tolylenediisocyanate) were dissolved in 89.5 parts by weight of methylethylketone to obtain a primer. The primer was dip coated on the above acid treated surface, and dried at 90° C. for 3 minutes to form a primer layer. The primer coated surface was dip coated with the surface coating agent according to Example 1, dried at 90° C. for 5 minutes, and then at 140 ° C. for 60 minutes to vulcanize. Finally, the solidified film was again turned inside out to the original state to obtain an elastic molding die having a coating on the inside surface.

Comparative Example 2

A rose flower-shaped solidified film was formed according to Example 6. The solidified film was turned inside out, without acid treatment and primer coating, dip coated with the surface coating agent according to Example 6, dried at 90° C. for 5 minutes, and then at 140° C. for 60 minutes to vulcanize. Finally, the solidified film was again turned inside out to the original state to obtain an elastic molding die having a coating on the inside surface.

Comparative Example 3

A rose flower-shaped solidified film was formed according to Example 6. The solidified film was turned inside out, without acid treatment, coated with a primer according to Example 7, the primer coated surface was dip coated with the surface coating agent according to Example 6, dried at 90° C. for 5 minutes, and then at 140° C. for 60 minutes to vulcanize. Finally, the solidified film was again turned inside out to the original state to obtain an elastic molding die having a coating layer of the surface coating agent on the inside surface.

The elastic molding dies obtained in Examples 6 and 7 and Comparative Examples 2 and 3 were subjected to peeling tests of the surface coating layers. The test results are shown in Table 2. The best result was shown by the elastic molding die (Example 7) which was coated with the surface coating agent after acid treatment and primer coating. The elastic molding die (Example 6) which was coated with the surface coating agent after acid treatment and the elastic molding die (Comparative Example 3) which was coated with the surface coating agent after primer coating showed almost the same results.

|  | Ex. 6 | Ex. 7 | Comp. Ex. 2 | Comp. Ex. 3 |
| --- | --- | --- | --- | --- |
| Peeling test (1) | 1000 | 1500 | 700 | 1000 |
| Peeling test (2) | 600 | 900 | 400 | 600 |

Referring to Table 2, in Peeling test (1), each elastic molding die is filled with cocoa butter, allowed to stand at 40° C. for 3 days, the cocoa butter is removed, the elastic molding die is inflated by 150%, and returned to the original state. This cycle is repeated at 20° C. The figure indicates the number of cycles until peeling of the surface coating agent can be visually noted. In Peeling test (2), the repetition cycle test is carried out at 0° C.

The surface coating agent of the present invention can be coated on the inside surface of an elastic molding die to enable a molding with improved surface gloss. Further, since the water resistance and oil resistance of the elastic molding die are improved, the elastic molding die can be prevented from being swollen and deformed due to water and oil ingredients in the molding material, thereby forming moldings having improved surface gloss over an extended period of time. Furthermore, filling properties of the molding material can be improved to fill fine structures of the molding die. The inventive surface coating agent improves releasability of molding from the molding die, and makes it easy to take out the molding from the molding die, thereby preventing the molding from being damaged. Moreover, since the inventive surface coating agent has good adhesion to the elastic molding die, no peeling will occur when the elastic molding die is repeatedly used. By incorporating silicone and a fluorine compound, surface gloss, releasability, and filling properties of the molding can be improved even further.

Furthermore, adhesion between the elastic molding die and the surface coating agent can be improved by coating the inventive surface coating agent after primer coating, thereby improving the durability and providing even further improved surface gloss of the molding. Further, adhesion between the elastic molding die and the surface coating agent can be even further improved by coating the inventive surface coating agent after acid treatment, or after acid treatment and primer coating.

What is claimed is:

1. A surface coating method for an elastic molding die comprising the steps of:

coating a primer on a surface of an elastic molding die to form a primed surface, said primer being selected from the group consisting of: a reaction product of a hydroxyl-terminated polydiene and a polyisocyanate, a mixture of an elastomer and a polyurethane, a cyanoacrylate compound, and an epoxy compound; and coating said primed surface with a polyurethane surface coating agent by applying a solution of a polyurethane surface coating agent to said primed surface and then drying said applied solution, said polyurethane surface coating agent having been obtained by reacting a polyol with an aromatic polyisocyanate.

2. The surface coating method according to claim 1, wherein said primer is a reaction product of a hydroxyl-terminated polydiene and a polyisocyanate.

3. The surface coating method according to claim 1, wherein said polyol is a polyether polyol, a polyester polyol or a polycarbonate polyol.

4. A surface coating method for an elastic molding die comprising the steps of:

contacting a surface of an elastic molding die with an aqueous solution of sulfuric acid for a period of time sufficient to form an acid treated surface;

washing said acid treated surface with water to form a washed surface;

drying said washed surface to form a dried surface; and coating said dried surface with a polyurethane surface coating agent by applying a solution of a polyurethane surface coating agent to said dried surface and then drying said applied solution, said polyurethane surface coating agent having been obtained by reacting a polyol with an aromatic polyisocyanate.

5. The surface coating method according to claim 4, wherein said aqueous solution of sulfuric acid contains 2 to 8% by weight of sulfuric acid.

6. The surface coating method according to claim 5, wherein said aqueous solution of sulfuric acid contains 4 to 5% by weight of sulfuric acid.

7. The surface coating method according to claim 4, wherein said polyol is a polyether polyol, a polyester polyol or a polycarbonate polyol.

8. A surface coating method for an elastic molding die comprising the steps of:

contacting a surface of an elastic molding die with an aqueous solution of sulfuric acid for a period of time sufficient to form an acid treated surface;

washing said acid treated surface with water to form a washed surface;

drying said washed surface to form a dried surface;

coating a primer on said dried surface to form a primed surface, said primer being selected from the group consisting of:

a reaction product of a hydroxyl-terminated polydiene and a polyisocyanate, a mixture of an elastomer and a polyurethane, a cyanoacrylate compound, and an epoxy compound; and coating said primed surface with a polyurethane surface coating agent by applying a solution of a polyurethane surface coating agent to said primed surface and then drying said applied solution, said polyurethane surface coating agent having been obtained by reacting a polyol with an aromatic polyisocyanate.

9. The surface coating method according to claim 8, wherein said aqueous solution of sulfuric acid contains 2 to 8% by weight sulfuric acid.

10. The surface coating method according to claim 9, wherein said aqueous solution of sulfuric acid contains 4 to 5% by weight sulfuric acid.

11. The surface coating method according to claim 8, wherein said primer is a reaction product of a hydroxyl-terminated polydiene and a polyisocyanate.

12. The surface coating method according to claim 8, wherein said polyol is a polyether polyol, a polyester polyol or a polycarbonate polyol.

* * * * *